(12) United States Patent
Bonin et al.

(10) Patent No.: US 9,435,889 B2
(45) Date of Patent: Sep. 6, 2016

(54) CASTER MOLD MEASUREMENTS USING A SCANNING RANGE FINDER

(71) Applicants: Michel Pierre Bonin, Danville, CA (US); Thomas Lawrence Harvill, Alamo, CA (US)

(72) Inventors: Michel Pierre Bonin, Danville, CA (US); Thomas Lawrence Harvill, Alamo, CA (US)

(73) Assignee: PROCESS METRIX, Pleasanton, CA (US)

(*) Notice: Subject to any disclaimer, the term of this patent is extended or adjusted under 35 U.S.C. 154(b) by 260 days.

(21) Appl. No.: 14/292,964

(22) Filed: Jun. 2, 2014

(65) Prior Publication Data

US 2015/0168552 A1 Jun. 18, 2015

Related U.S. Application Data

(60) Provisional application No. 61/916,148, filed on Dec. 14, 2013.

(51) Int. Cl.
| | | |
|---|---|---|
| G01C 3/08 | (2006.01) | |
| G01S 17/42 | (2006.01) | |
| G01B 11/24 | (2006.01) | |
| G01S 7/48 | (2006.01) | |

(52) U.S. Cl.
CPC ............ *G01S 17/42* (2013.01); *G01B 11/24* (2013.01); *G01S 7/4808* (2013.01)

(58) Field of Classification Search
CPC ....... G01S 17/42; G01B 11/24; G01B 21/04; G01B 21/20
USPC ...................................................... 356/5.01
See application file for complete search history.

(56) References Cited

U.S. PATENT DOCUMENTS

| | | | | |
|---|---|---|---|---|
| 8,072,613 | B2* | 12/2011 | Schmitz | G01N 21/954 266/100 |
| 2009/0250188 | A1* | 10/2009 | Shutts | B22D 11/168 164/452 |
| 2014/0336806 | A1* | 11/2014 | Bewlay | G06F 17/50 700/98 |

* cited by examiner

*Primary Examiner* — Mark Hellner
(74) *Attorney, Agent, or Firm* — Thomas Clinton; Donald M. Satina

(57) ABSTRACT

Apparatuses, methods, and systems are disclosed for the characterization of the integrity and profile measurement of a caster mold by use of a scanning device, a positioning fixture, and a data reduction device connected to the scanning device, the data reduction device being configured to characterize the integrity and to measure the profile of the caster mold by comparing scanned distances to reference distance values.

21 Claims, 12 Drawing Sheets

CASTER MOLD MEASUREMENTS USING A SCANNING RANGE FINDER

CROSS REFERENCE TO RELATED APPLICATIONS

This application claims priority to U.S. Patent Application of Ser. No. 61/916,148, filed on Dec. 14, 2013, entitled "Caster mold Measurements Using a Scanning Laser Range Finder," the contents of which are herein incorporated by reference in their entirety.

BACKGROUND

1. Technical Field

Embodiments of the subject matter disclosed herein relate generally to apparatuses, methods and systems and, more particularly, to devices, processes, mechanisms and techniques for characterizing the integrity of caster molds.

2. Description of Related Art

Figure 1:
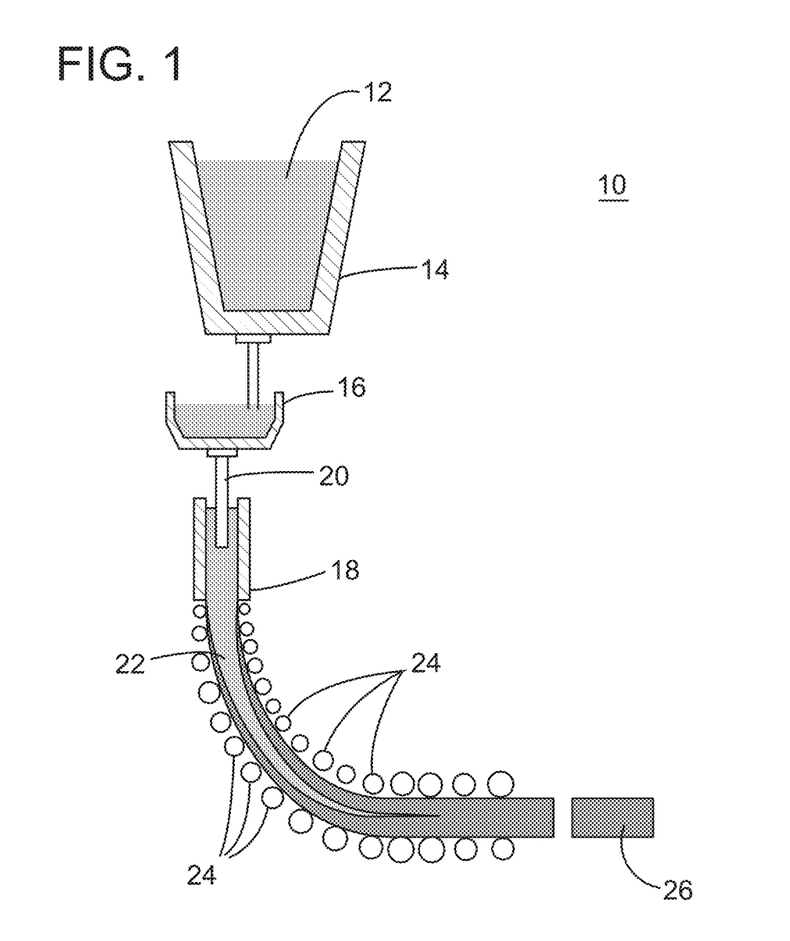
FIG. 1 illustrates a typical arrangement and components of a continuous casting operation.

In the 1970's and 1980's continuous casters were developed to eliminate the time and energy consuming process of ingot pouring. As illustrated in FIG. 1, in a continuous caster 10, molten metal 12 is drained from a ladle 14 into a tundish 16. The tundish 16 allows a pool of metal to feed the casting portion of the continuous caster 10 and acts as a buffer to the caster feed while an empty ladle is exchanged for a full one. At the head of the casting machine is the caster mold 18; a cavity of variable dimensions and inner profile that contains the molten steel until it is solidified. The caster mold 18 receives molten steel from the tundish 16 through the tundish shroud 20; a carefully designed tube that is integrated with the profile of the caster mold 18 so as to create minimal turbulence in the caster mold cavity. The caster mold 18 is typically made of copper and is water-cooled. Heat transfer to the molten steel causes a thin shell of solidified metal to form next to the caster mold walls. The shell exits the caster mold 18, typically in the vertical orientation, with the center of the shell (now called a strand 22) still molten. The strand 22 is slowly turned to the horizontal direction by a series of closely spaced rollers 24 that support the ferrostatic pressure of the still-solidifying interior of the strand 22. After sufficient cooling, the strand 22 is cut into a slab 26, which is further cooled for subsequent processing.

Over time, as molten steel is processed in the caster mold 18, the soft copper walls of the caster mold 18 slowly erode and corrode as the steel solidifies against the surface of the caster mold 18. This results in a change in the shape or profile of the caster mold 18 and this change in profile can eventually reach a point where contact with the strand 22 is lost. This loss of contact results in a substantial decrease in heat transfer from the strand 22 and a decrease in the ferrostatic pressure of the molten material inside the strand 22 generating breakout forces that will prevent the thin shell from being contained within the caster mold 18, thus resulting in the undesirable interruption of the casting process before the heat (batch) of steel contained in the upstream ladle has been fully processed. More importantly, this breakout can potentially damage the caster mold 18 depending on how much molten steel is allowed to drain into the caster mold 18 before the breakout is terminated. A second breakout mechanism occurs when the walls of the caster mold 18 themselves become unacceptably thin, leading to breakout there through by the fully molten steel in the upper caster mold sections. Either of these undesirable conditions result in costly recovery due to lost production time and damaged components. (See, for example, Park, et al., "Thermal and Mechanical Behavior of Copper Molds during Thin-Slab Casting, Part I, Plant Trial and Mathematical Modeling," Metallurgical and Materials Transactions B, Volume 33b (2002), the contents of which are incorporated by reference herein in their entirety.)

Figure 2:
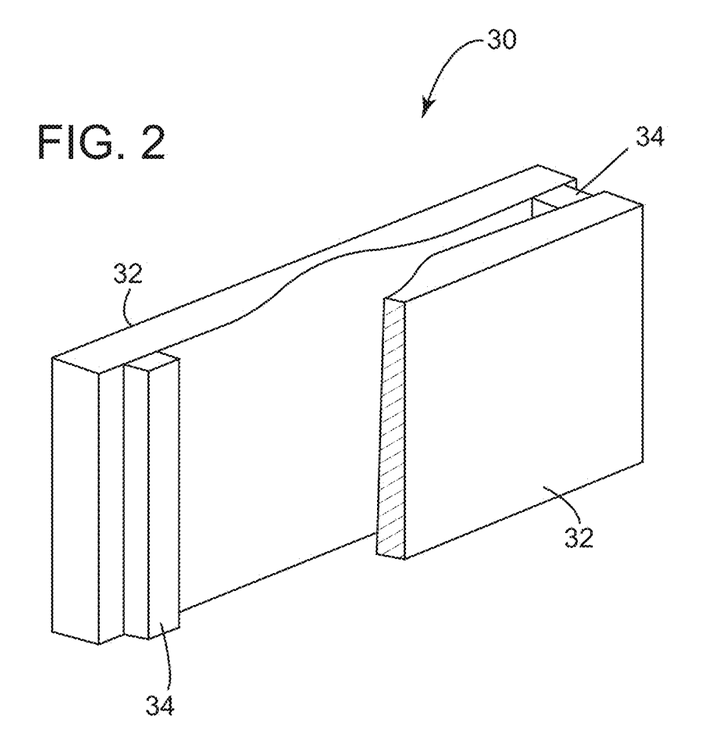
FIG. 2 illustrates a cut-away view of a typical thin slab caster mold.

Caster mold dimensions for slab casters typically range from about 30 to about 450 mm in depth (corresponding to the narrow face of the caster mold) and from about 1300 to about 3250 mm wide (corresponding to the broad face of the caster mold). The first slab casters were thick slab casters designed primarily to replace ingot caster mold processing. Slab thicknesses produced in thick-slab casters are on the order of about 250 mm to about 400 mm. As casting technology improved, thin slab casters were developed to cast steel closer to the final product size. FIG. 2 illustrates a cut-away view of a typical thin slab caster mold 30. As mentioned, these caster molds normally have two broad faces 32, corresponding to the long faces of the cavity, and two narrow faces 34 at the ends of the broad faces 32, corresponding to the short walls of the caster mold 30. In thin slab caster molds, each broad face 32 includes a central curved elliptical profile defining a funnel shape so as to accommodate the tundish shroud 20 and parallel portions on either side of the curved central portion extending to the narrow faces 34 of the caster mold 30 on either side. Thin slab casters typically have broad face dimensions less than about 100 mm and are operated at higher casting speeds. Because of the higher caster speeds, caster mold heat flux is considerably higher than that in a thick slab caster. The higher heat flux subjects the thin slab caster mold to thermal stress, particularly at the meniscus line, causing permanent creep and deformation and, in some cases, crack formation in the caster mold surfaces. (See, for example, Carboni, et al., "$4^{th}$ Generation of Thin Slab Casting Technology," MPT International, pages 34-38, April, 2011, the contents of which are incorporated by reference herein in their entirety.)

Avoiding the creation of cracks in the caster mold surfaces and maintaining close dimensional tolerances is important to operational safety and caster productivity, thus the need to monitor the integrity of these apparatuses and to measure the internal profiles thereof on a regular basis. Conventionally, visual inspection by an experienced user has been used, but the uncertainties and downtime required with such an approach are well recognized by those skilled in the applicable arts. For thick slab caster molds, for example, contact sensors have been developed that can be inserted into the caster mold to give a direct measurement of the distance between the broad faces. However, the problems associated with these devices are well known in the art. For example, use of these contact sensors must be done manually and offline when the caster mold is cold. Moreover, these contact tools have been developed primarily for caster molds that have rectangular cross-sections. Thus, besides the amount of downtime required to make such manual measurements, these measuring devices become difficult to apply and the measurements challenging to interpret when measuring parabolic face profiles common in thin slab caster molds.

Therefore, based at least on the above-noted challenges with conventional devices to characterize the integrity of caster molds and to measure the profiles thereof, it would be advantageous to have improved devices, methods, and systems capable of such characterization and measurements with a substantial reduction in downtime.

SUMMARY

One or more of the above-summarized needs or others known in the art are addressed by apparatuses, methods, and processes for measuring a profile of a caster mold. As disclosed here, such apparatuses include a scanning device having a laser, optics, a scanner, a photodetector, and receiver electronics to measure distances from a position of the scanning device to a plurality of points on internal surfaces of the caster mold. It also includes a fixture to which the scanning device is attached to position the scanning device with respect to the caster mold and a data reduction device connected to the scanning device to measure the profile of the caster mold by comparing the measured distances to reference distance values.

Methods for characterizing the integrity and measuring a profile of a caster mold according to the subject matter disclosed herein include steps of positioning a scanning device having a laser, optics, a scanner, a photodetector, and receiver electronics with respect to the caster mold by use of a fixture, scanning a plurality of distances from a known position of the scanning device to a plurality of points on internal surfaces of the caster mold; and comparing the plurality of distances to reference distances.

BRIEF DESCRIPTION OF THE DRAWINGS

The accompanying drawings (not drawn to scale), which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of apparatuses, systems, or methods for monitoring the integrity and measuring the profile of a caster mold used in the metallurgical industry, including thin and thick slab caster molds. However, the embodiments to be discussed next are not limited to these exemplary sets, but may be applied to other apparatuses, systems, or methods, including, but not limited to, the characterization, profiling, and/or measuring of other internal surfaces.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures, or characteristics may be combined in any suitable manner in one or more embodiments.

Figure 3:
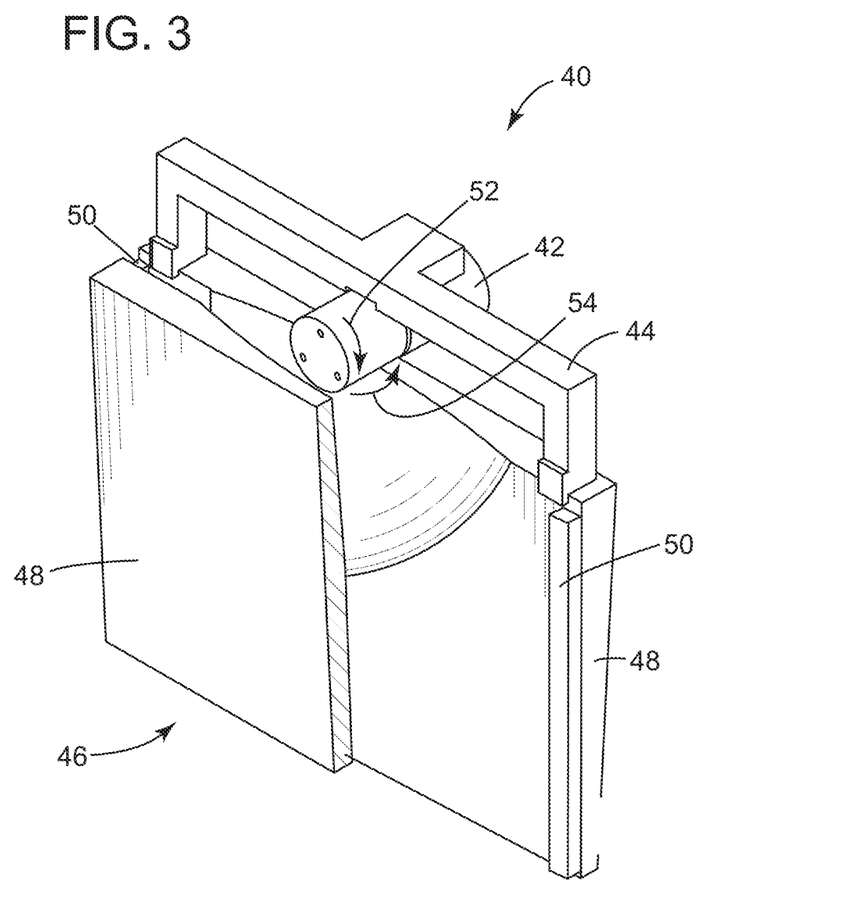
FIG. 3 illustrates an embodiment of an apparatus to monitor the integrity and measure the profile of a caster mold according to the subject matter disclosed.

An exemplary embodiment of a caster mold scanner 40 according to the subject matter disclosed is illustrated in FIG. 3. As shown, a fixture 44 is used to position a laser scanner 42 over a caster mold 46 so as to allow the characterization of its integrity by measuring its internal profile using the laser scanner 42. As illustrated, two opposing relatively large broad faces 48 and two relatively small narrow faces 50 disposed at end portions of the broad faces 48 define the cavity of the caster mold 46.

The scanner 42 is a remote sensing technology that measures distance by illuminating a target with a laser and measuring the time it takes the reflected light to return back to the source. A typical scanner 42 includes a laser, a scanner, optics, a photodetector, and receiver electronics. Those of ordinary skill in the applicable arts will appreciate, after reviewing the subject matter herein disclosed, that various different types of lasers might be used in the scanner 42, including lasers having different wavelengths as well as different modes of operation (e.g., pulsed or continuous types). As it will be further discussed below, accuracy and resolution of the characterization and measurement of the caster mold 46 will depend on how the laser in the scanner 42 is focused by the optics, which will also define the field of view of the scanner 42. Better resolution can be achieved with shorter pulses provided the receiver detector and electronics have sufficient bandwidth to cope with the reduced pulse width. The speed at which images can be developed is affected by the speed at which it can be scanned into the system. A variety of scanning methods are available to scan the beam through the required azimuth and elevation angles. These include dual oscillating plane mirrors, dual axis scanner, and polygonal mirrors. Accurate mirror positioning affects measurement accuracy. Scanning using polygonal mirrors lends itself to measurement with high resolution encoders and is frequently used in scanning laser range finders.

In addition, the caster mold scanner 40 may include a data reduction device. This data reduction device may be incorporate inside of or connected to the scanning device. Such data reduction unit may be configured to characterize the integrity of the caster mold and to measure the profile of the caster mold by comparing the measured distances to reference distance values.

In one preferred embodiment, a Light Detection And Ranging (LIDAR or LiDAR) laser scanner with sufficient field of view to determine the profile of both the broad faces 48 and the narrow faces 50 of the caster mold 46 is used in the scanner 42. Such lasers are configured to fire rapid pulses of laser light at a target surface, some at up to 500,000 pulses per second. A sensor on the instrument measures the amount of time it takes for each pulse to bounce back from the target surface to the scanner. Light moves at a constant and known speed so the scanner 42 can calculate the distance between itself and the target with high accuracy. By repeating this in quick succession the instrument builds up a complex 'map' of the surface it is measuring. By calculating and/or comparing changes between measured range maps of the mold internal surfaces with reference measurement of the same surfaces, changes are detected and evaluated for possible changes that may result in a failure of the caster mold 46.

In some applications of the caster mold scanner 40 the laser scanner 42 is left in place, ready to measure when caster mold conditions are suitable. In some other applications, taking into consideration a particular caster mold configuration and proximity of adjacent processing equipment (e.g. the tundish and shroud), at-process measurements are obtained by having the scanner 42 installed and removed prior to and after measurement by use of the fixture 44, for example. Such configurations may be used, for example, during polishing of a mold and/or when changes of steel grade are made during the manufacturing process. In other embodiments, the fixture 44 and scanner 42 are moved in place robotically without the need of human interference and caster mold measurements can be performed.

In order to account for variations in mold profile during use, a reference measurement can be made of a new mold (or of a reference mold) prior to putting the mold into service. The reference scan is made in the same way as a standard measurement of the mold. However, the reference is stored in software and used to compare subsequent scans made after the mold has been used to process steel. Differences in profile shape between the reference and current measurement may be used to indicate wear areas, pits, or cracks that may have developed in the mold surface.

The fixture 44 may be designed to facilitate rapid installation and removal with a minimum of fasteners, and to reference its position against one of the caster mold faces. In order to determine the mold profile, the relative position of the scanner and the mold should be known. Errors in position translate directly to mold thickness measurement error. Angular positioning error is particularly relevant since thickness error is magnified by the range vector. In practice, even with reference positions on the mold itself, it could be difficult to place the fixture securing the scanner to the mold in the same position for each measurement. Failing to account for this variation will lead to unacceptably high measurement error. In these cases, since the external and internal mold corners and edges are clean and well defined, they can be used to determine the relative position of the scanner and the mold, thus eliminating the positioning uncertainty. In other embodiments, other external features on or away from the caster mold may be used to reference the scanner with respect to the caster mold. Examples of these references points may include, but are not limited to, reflectors placed on the caster mold or in the vicinity of the measurement.

Embodiments using a fixture to position the scanner would also allow off-line profiling of caster molds either being prepared for service or coming out of service. The former is important from the perspective of developing a baseline caster mold profile; the latter provides information on whether the caster mold can be cycled back into service or must be scrapped.

As noted above, in some embodiments of the subject matter herein disclosed, the field of view of the scanner 42 is large in both dimensions. In the operation of the scanner 42, as shown in FIG. 3, a slow-scan direction 52 is referred to as the direction parallel to the direction of rotation of the scanner's turret. A fast-scan direction 54 is the direction perpendicular to the slow-scan direction 52. In applications to caster mold measurement, the required slow- and fast-scan fields of view can be substantially large (e.g., upwards of 150°), thereby facilitating characterization and/or measurement of the entire caster mold interior in one scan at high resolution.

In some embodiments the scanner 42 is placed as close to the caster mold as possible without violating the slow- or fast-scan field-of-view requirements described above. Moreover, many scanners have a minimum standoff distance within which range measurements are not possible. In order to maximize performance, particularly relative to beam diameter (see discussion below), a scanner having near zero standoff distance may be preferred in some applications. For many LIDAR systems, the receive electronics require settling time after detecting the presence of the outbound laser pulse before they are able to detect the return signal. This settling time defines the closest measurable distance between the scanner and a near-field target. Typical stand-off distances are on the order of about 1 to about 2 m. The standoff distance can be eliminated by special configuration of the receive electronics, or optically by incorporating a length of optical fiber between the LIDAR system's collection optics and the photodetector.

Figure 4A:
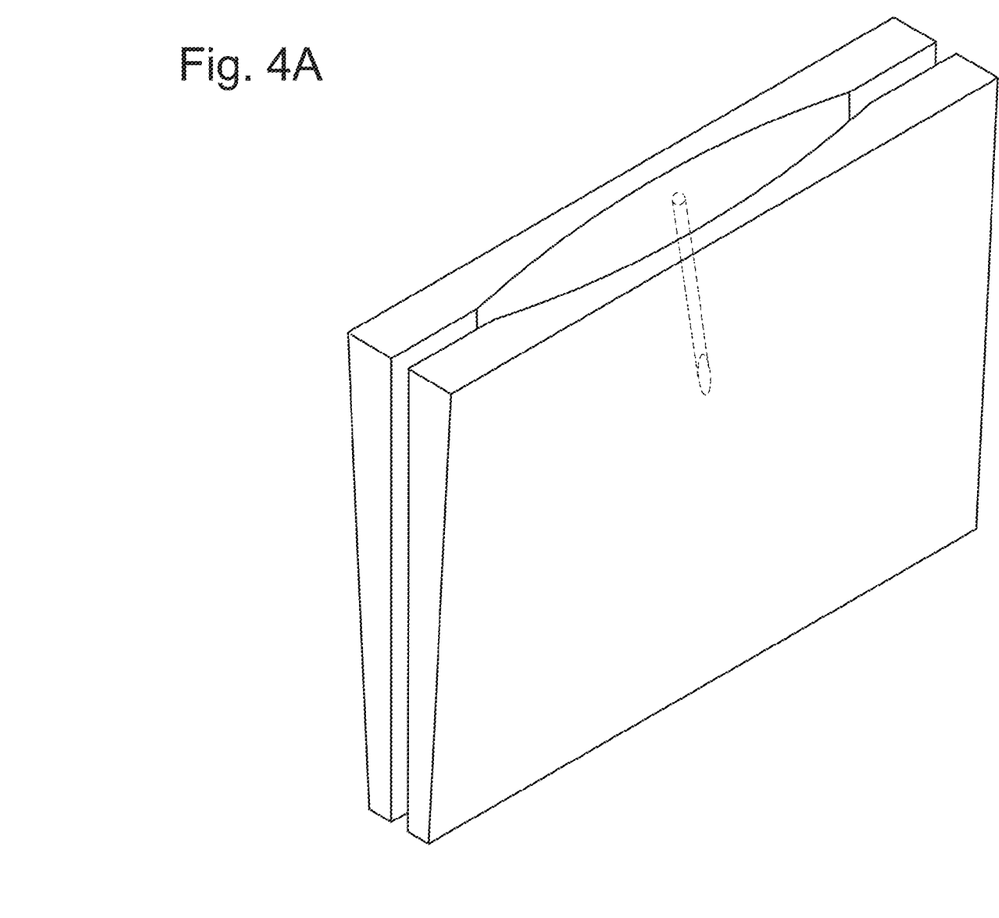
FIGS. 4A-4C illustrate the elliptical nature of a round laser beam incident on a slab caster mold (4A) and the spot size elongation as a function of location along a broad face of a slab caster mold for two different optical configuration (for focused laser in FIG. 4B and for collimated laser in FIG. 4C) of an apparatus to monitor the integrity and measure the profile of a caster mold according to the subject matter disclosed.

As previously noted, depending on the optics of a given device and the high angle of incidence typical of the caster mold measurements described herein, the beam profile incident on the caster mold surface will vary depending on the inside location where measurements are being made. That is to say, depending on the optics used in some embodiments, the beam profile incident on the caster mold surface might be elongated in a direction parallel to the incident surface. FIG. 4 illustrates the shape of a laser beam after impinging a surface of a caster mold during measurement and variations of that shape for two optical configurations of a scanned beam. As shown in FIG. 4A, when viewed from an orientation perpendicular to the broad face of the caster mold, the profile of a circular laser beam takes on an elliptical shape when incident on the caster mold face. The degree of ellipticity depends on the location of the laser beam in the caster mold (e.g. the azimuthal coordinates $(\phi,\theta)$ that define the local scan angle), the local caster mold profile, and the optics of the scanner, as discussed next.

Figure 4B:
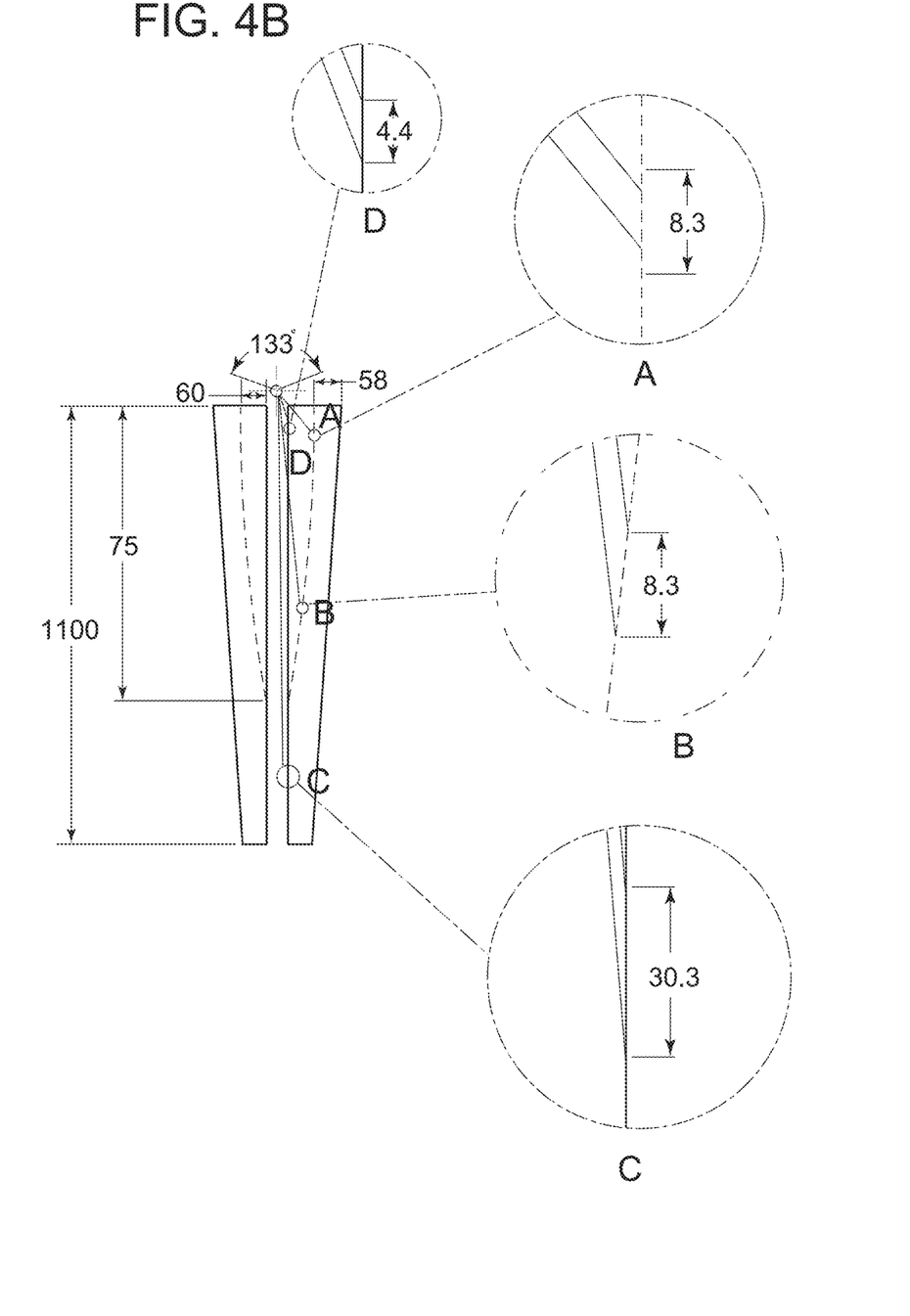
Figure 4C:
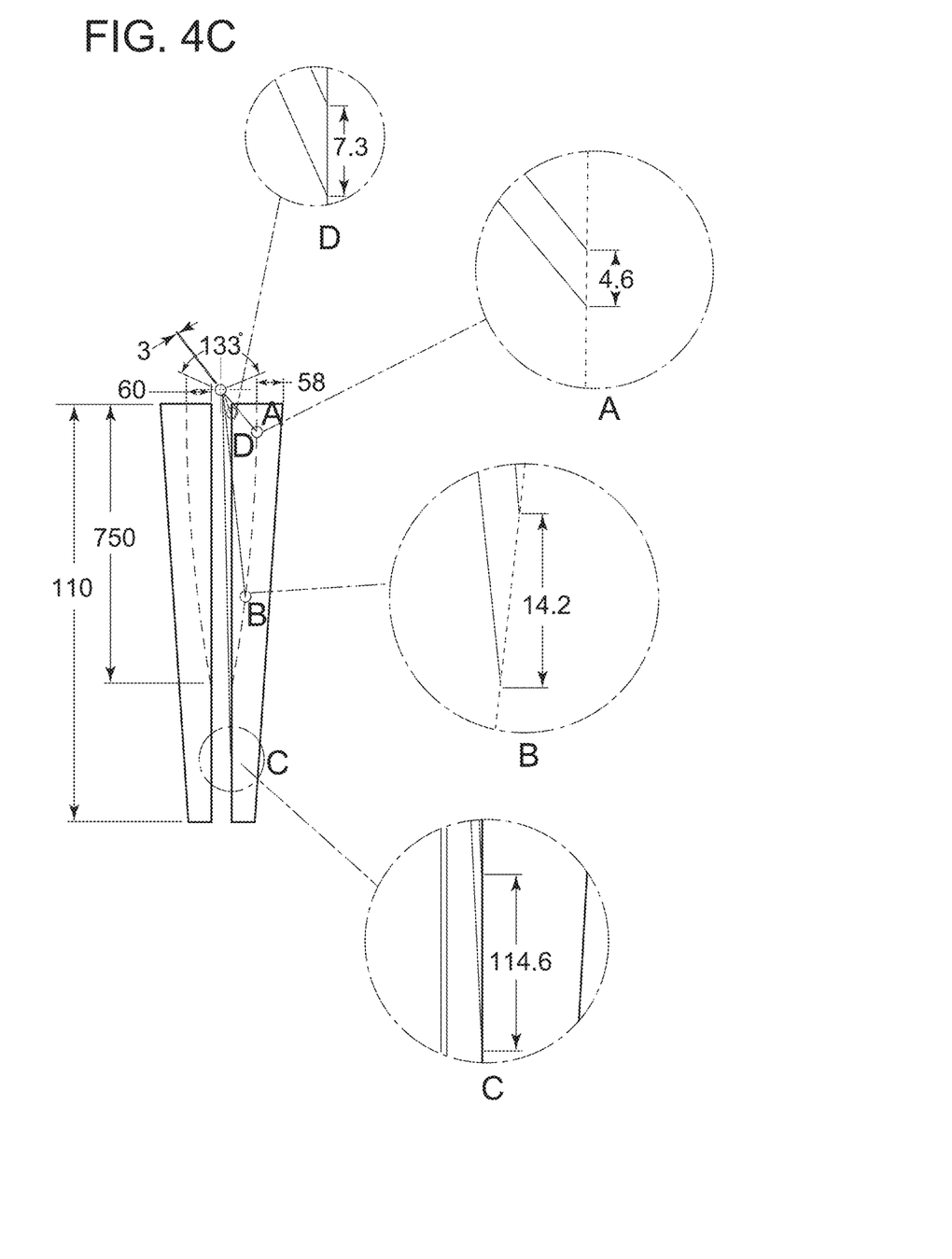

FIGS. 4B and 4C illustrate changes in laser beam spot size elongations as a function of location along a broad face of a slab caster mold for two different optical configurations. In FIG. 4B, an optical arrangement having a focused laser beam is selected that results in less variation (a maximum of about 8:1) throughout the mold. This compares favorably to the collimated laser beam embodiment shown in FIG. 4C that has a variation in laser beam spot size exceeding 25:1. In both FIGS. 4B and 4C, four locations A-D have been selected to illustrate this point. Locations A and D are near the upper opening of the caster mold, location B is midway along the mold's broad face, and location C is towards the exit of the mold. Location A is at a point on the parabolic section of the mold's broad face and location D is at a point on the parallel (flat) section of the broad face.

Considering orthonormal projections aligned with the centerline of the slow- and fast-scan directions, the elongation of the laser spot incident on the caster mold surface at the bottom of the caster mold (furthest from the scanner) can be as high as 25 times that at the top of the caster mold (nearest the scanner) (see FIG. 4C). The orthonormal projections for the fast scan axis illustrated in FIG. 4B represent an exemplary limiting case. As those of ordinary skill will appreciate, various combinations of elongation in the fast- and slow-scan directions will occur for non-orthonormal projections, which will also be affected by the scanner optics.

In order to preserve a desirable spatial resolution of a set of measurements of a caster mold, minimization of the laser spot size on the caster mold surface should be taken into consideration, a small spot size yielding higher sensitivity to local surface topology. Moreover, optimal spatial resolution will be observed when the laser beam is substantially small, less than 1 mm. However, current beam collimation limits may preclude creation of a collimated laser beam at diameters less than about 2 to about 3 mm. Below this limit, beam focusing may be required to create a small, focused, laser spot at the surface of the caster mold. While a beam diameter on the order of 0.5 mm can be created using focusing optics, this geometry has the undesirable consequence of having the desired diameter at only one prescribed distance from the focusing lens typically equal to the lens (or lens combination) focal length. At all other points, the beam is either larger and converging, or larger and diverging. Because the spot size elongates quite quickly as the angle of incidence increases, choosing a focal distance corresponding to a measurement near the bottom of the caster mold and depending on the use of a focused or collimated laser beam can reduce the variation in spatial resolution between measurements at the top and bottom of the caster mold from the aforementioned 25:1 to 8:1, as shown in the comparisons of FIGS. 4B and 4C. At the top of the caster mold, the illumination spot on the surface will not be in focus (the beam will still be converging) and the resulting spot size will be larger in the dimension perpendicular to the fast-scan direction. As the beam moves towards the bottom of the caster mold, the degree of focus increases and the spot size on the caster mold surface is reduced. However, the angle of incidence increases, as does the ellipticity of the beam so the overall spot size increases, particularly in the dimension parallel to the fast-scan direction. The proper choice of focusing optics depends on where in the caster mold spatially detailed measurements are needed, and on the geometry of the caster mold.

The high angle of incidence and elliptical elongation of the spot size on the caster mold face can be further mitigated by making two scans of the caster mold from locations offset to the left and right of the caster mold centerline. Consider a line bisecting the narrow faces of the caster mold that defines its longitudinal centerline. The scanner is offset in a direction parallel to the narrow face of the caster mold. The left broad face of the caster mold is measured with the scanner offset to the right of the caster mold's longitudinal centerline, and the right broad face is measured with the scanner offset to the left of the caster mold longitudinal centerline. Shifting the position of the scanner to the left and right of the mold centerline decreases the angle of incidence between the laser beam and the mold face. As we have already seen in FIG. 4, decreasing the angle of incidence reduces the ellipticity of the laser beam incident on the mold face. The range data are subsequently combined into one large data set by transforming each individual measurement into the same global coordinate system. Clearly, this approach requires a fixture that can reposition the scanner quickly and perhaps automatically. The offset amount depends on the dimensions of the mold. Ideally, the scanner would be offset to the left and right of the mold by the greatest distance possible that still preserves a complete "view" or scan of the opposing broad face of the mold. For a thin slab caster mold at a minimum this equates to half the narrow face dimension. At a maximum, it equates to half the maximum distance between the elliptical sections of the mold.

In order to reduce surface friction, new caster molds are plated with nickel or a nickel alloy. Because of the high reflectivity of the nickel surface and the high angle of incidence, only a small number of photons are reflected back to the scanner and the laser signal strength may be poor. The balance is reflected in the direction of laser beam propagation, away from the scanner's light collection optics. After processing a few heats of steel, the nickel surface becomes rough and loses its reflectivity; both conditions contribute to improved reflectivity to the laser collection optics, and hence enhanced laser signal strength. As noted above, measurements are needed when a new, nickel-plated caster mold is first put into service. Under these conditions, the application of a suitable surface conditioner that adds a modest amount of surface roughness and reflectivity reduction may be used in order to improve laser detection, particularly in the lower sections of the caster mold where the angle of incidence is the highest. Suitable surface treatments include coatings that are quickly consumed as molten steel enters the caster mold such as flat paints, ceramic sprays, and even amalgams made from caster mold powder and a suitable binder.

In order to provide accurate characterizations of the caster mold face's profile, a scanner instrument with high range accuracy is desired. Most scanning LIDAR instruments are capable of about 5 to about 10 mm range uncertainty. Considering current existing technologies, those of ordinary skill will appreciate that LIDAR instruments capable of an uncertainty range from about 0.5 mm to about 2 mm are available. This level of accuracy may improve caster mold profiling applications. As discussed above, small changes in mold thickness and shape can result in significant performance degradation. Over its lifetime, the permissible thickness variation of the mold is on the order of about 5 mm. Thus, the LIDAR system used to measure distance to a plurality of points distributed on the mold face should have a range uncertainty on the order of about 1.2 mm to provide calculated thickness values that are useful to the steel maker. Since mold thickness is measured normal to the mold surface, not all of the range measurement uncertainty translates directly to thickness uncertainty. Specifically, thickness uncertainty due to range uncertainty is determined by multiplying the range uncertainty by the cosine of the local angle between the range vector (the line between the LIDAR scanner and any given range point on the mold surface) and the surface normal. Since the grazing angles are quite high in this application, the thickness uncertainty can be quite small even for a LIDAR instrument having a range uncertainty in excess of about 2 mm.

Moreover, If measurement error is random, taking local spatial averages of multiple scans of the same surface can reduce measurement uncertainty. In this case, the measurement error will decrease as the inverse square root of the number of measurements in the average. Measurement precision needs also to be considered. If the measurement is repeatable, this creates the potential to compare baseline measurements with those made subsequently over the lifetime of the caster mold and arrive at an acceptable characterization of caster mold wear and/or potential failure hazardous.

Measurement accuracy is also adversely affected by the presence of smoke and dust (condensed phase) in the field of view. In sufficient number density, the condensed phase will backscatter photons to the LIDAR scanner and appear as a "surface" to the LIDAR instrument. Absent a means for eliminating (or filtering out) the false returns, the final data may suggest a surface (albeit an amorphous one) at the location where the condensed phase was detected. Several methods for eliminating this effect are within the scope of the subject matter disclosed herein, as discussed next.

The first approach is to filter the acquired data for random and infrequent condensed phase filtering via statistics. This filtering assumes that the surface of interest is manifold, i.e., locally continuous and smooth. Given this assumption raw measurement points can be compared to its immediate neighbors. If any given point is substantially different than its neighbors then it can be filtered out of the data set. The statistical analysis can, for example, be conducted using the range value in a spherical coordinate, but is not limited to any specific coordinate in Euclidian space. Such an approach is similar to a definition of a volume inside the surfaces of interest that prevent inclusion of suspect information in the reduced data should a data point fall inside this volume. The interior profile of the caster mold is known. Furthermore, the profile is substantially constant from mold-to-mold for a given application. This allows the definition of a three dimensional filter volume that is 3-5 mm smaller (in all dimensions) compared to the inner volume defined by the broad and narrow faces of the caster mold. After reducing the range data and transforming the same to the coordinate system of the mold, any range data point that falls inside the filter volume can be presumed to be a spurious data point, and can be removed from the data set.

The second filtering approach is a topological filtering given an expected topology. When measuring a "known" surface topology one can assume that the measured points must fit the topology within a threshold distance. For caster mold applications the surface topology of the mold changes by less than about 5 mm so one can safely assume that any points in the measurement further than this distance from a reference measurement of the mold can be filtered out of the data set. The reference surface is a measurement of the mold under ideal (or before use) conditions. Such a filtering approach may be similar to a three-dimensional data processing that "looks" for multiple surfaces along trajectories normal to the primary surface of interest so that unwanted "surfaces" may be eliminated.

A third example of a filtering approach is the use of a robust least-squares filter. Again assuming the surface of interest is manifold, a robust least-squares method can be used to filter points from the data. This filter is intrinsic in robust least-squares methods using point weighting. One possible implementation is to weight the least-squares solution with the $1/\sigma^2$ value of distance from the fitted surface for each point. Of course other implementations are within the scope of the subject matter being disclosed as understood by those of ordinary skill in the art. In order words, a least squares data fitting may be compared to a spatial differentiation to eliminate data points that are far away (in a relative sense) from the primary surface, again taking the primary surface as the outermost geometrical feature observed in the data set.

In combination, these filters prevent condensed phase returns from becoming part of the final reduced data set that characterizes the caster mold surface profile. This approach works well for all points excepting those that are immediately adjacent the true surface of interest. When the separation between the actual surface and the false surface created by the condensed phase return is less than the instrument measurement uncertainty, it is difficult, if not impossible, to separate the two algorithmically.

Figure 5:
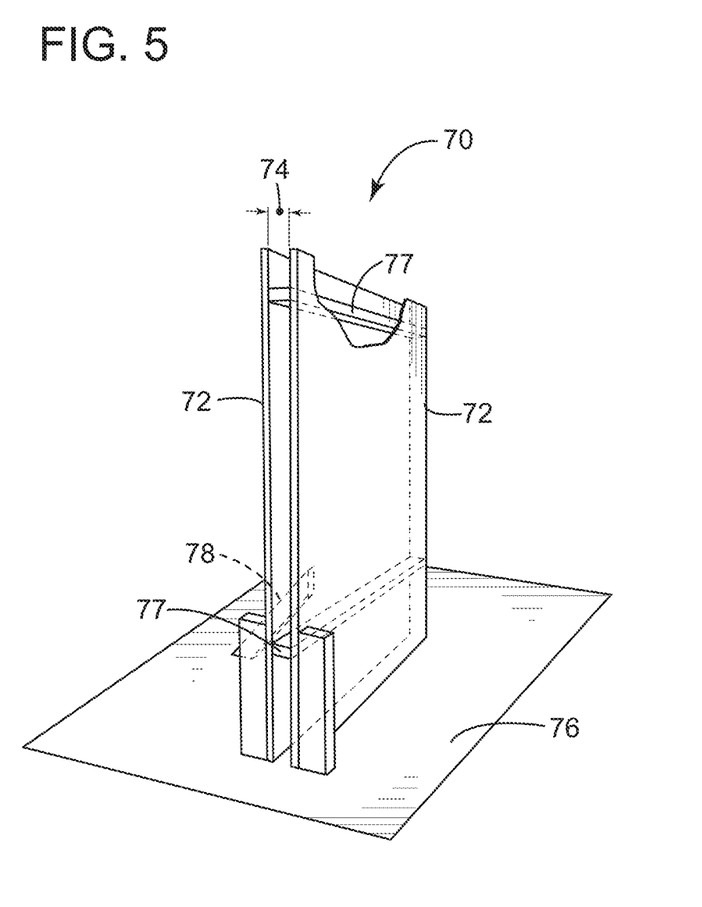
FIG. 5 illustrates an experimental setup to simulate the walls of a slab caster mold.

In one embodiment, a LIDAR scanner has been developed with a 4-mm collimated beam that is capable of large fast- and slow-scan angles at data collection speeds of up to about 66 KHz with a range measurement uncertainty ranging from about 1 to about 2 mm. In order to evaluate the feasibility of using a scanning laser range finder to characterize and measure the profile of a caster mold, a simple model of a caster mold was built from two, parallel, flat plates separated by 50 mm—a distance that replicates a typical separation of the broad faces of a thin slab caster mold. Although this simulated caster mold does not model the parabolic section of an actual mold, an important aspect of the measurement is the accurate measurement of the caster mold faces in the region where the caster mold faces are only separated by a short distance (about 50 mm in these simulating experiments). Because the laser beam has a lower angle of incidence in the parabolic region of the caster mold (see, for example, FIGS. 4A and 4B), this region will be less challenging to measure accurately. An illustration of the simulated caster mold 70 is shown in FIG. 5. As shown, a caster mold was simulated by disposing two long flat pates 72 separated from each other by a gap 74 of about 50 mm on a supporting stand 76. In addition, spacers 77 were used to maintain the two plates separated from each other by the desired distance of about 50 mm. These spacers 77 also simulate the narrow face of the mold. In addition, a strap 78 was also used in order to maintain the two plates in a stable vertical position during the profile characterization and measurements.

Figure 6:
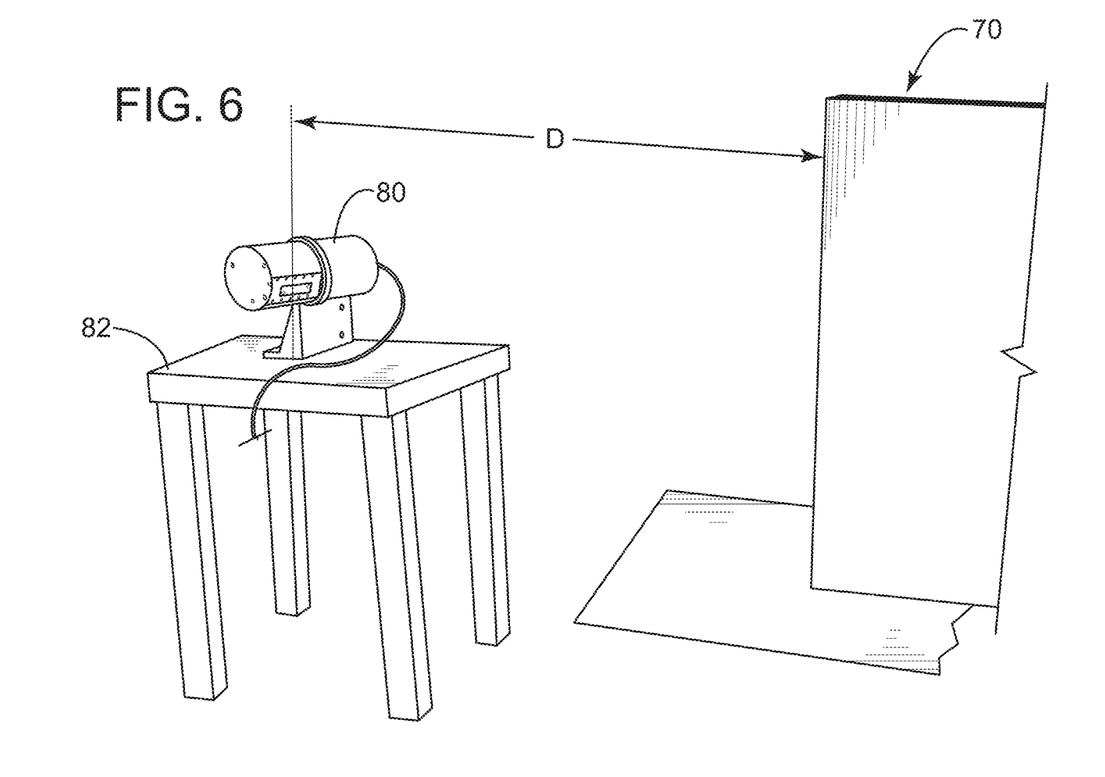
FIG. 6 illustrates another embodiment of an apparatus to monitor the integrity and measure the profile of the simulated caster mold of FIG. 5 according to the subject matter disclosed.

During these tests, as illustrated in FIG. 6, an Anteris TDS-200 laser scanner 80 was used such that the simulated caster mold 70 was on the approximate optical centerline of the scanner. The Anteris laser scanner 80 was mounted on an optical table 82 to ensure repeatable measurement from the same position. The Anteris laser scanner 80 in these experiments has a minimum measurable range of about 1.5 m and, as such, the simulated caster mold 70 was separated from the laser scanner 80 by a distance D of about 1.5 m.

Two scans were made of the simulated caster mold 70, one each three inches to the left and to the right of the caster mold centerline. As described above, this was done to create the greatest view angle between the scanner and the broad face of the simulated caster mold and to minimize the aforementioned angle of incidence between the laser beam and the simulated caster mold surface. The right side face was measured with the Anteris scanner moved to the left of center, and the left side face was measured with the Anteris scanner moved to the right of center. The two measurements, resulting in two three-dimensional data sets representing the internal surfaces of the two flat plates, were combined and then analyzed to determine how accurately the data reflects the known dimensions of the simulated caster mold.

Figure 7:
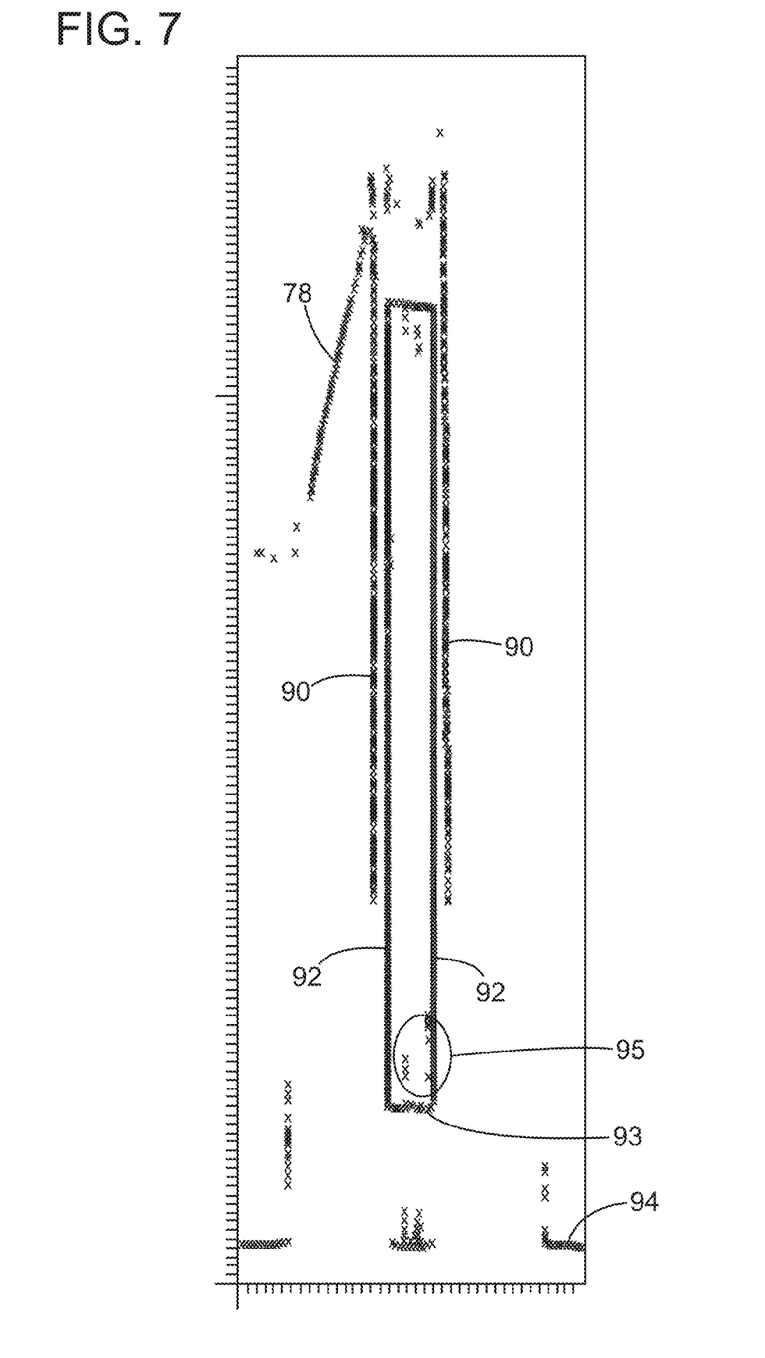
FIG. 7 illustrates a two-dimensional slice through the three-dimensional data produced by the device shown in FIG. 6 approximately 30 mm from the front edge of the simulated mold of FIG. 6.

FIG. 7 represents a slice through the scan data approximately 300 mm from the front edge of the simulated caster mold. As shown in FIG. 7, because both the outer (90) and inner (92) surfaces of the simulated caster mold were in the field of view of the scanner when it traversed left and right of center, both of these surfaces were detected. In addition, several other features were characterized during these measurements, including: (1) the strap 78 used to maintain the simulated mold in a vertical position; (2) the "narrow face" of the simulated mold at 93 (represented by the spacers 77); (3) the surface of the supporting stand 76 at 94; and (4) various spurious data point at 95. Those of ordinary skill will appreciate that, when measuring an actual caster mold, the outer surfaces of the caster mold would not be in the field of view of the laser scanner, but would be blocked by supporting ancillary equipment.

Ignoring the extraneous information and focusing on the broad faces of the simulated caster mold, one can measure the distance between the caster mold faces and conclude that their separation ranges from about 48 to about 50 mm. This value is in good agreement with the known separation of the simulated caster mold surfaces of the model used. Moreover, although not shown here, small variations in the range from about 1 to 3 mm in size are clearly visible in the data, giving confidence that one can capture surface topology changes on the actual caster mold surface that are on the order of this size and scale. This is encouraging, particularly given the characteristics of the laser scanner used, as already described. As noted above, a laser scanner properly focused to a laser spot size at least two times smaller and with a zero standoff distance would significantly improve these test results, the latter characteristic improving the field of view by allowing the scanner to be moved closer to the caster mold.

Figure 8:
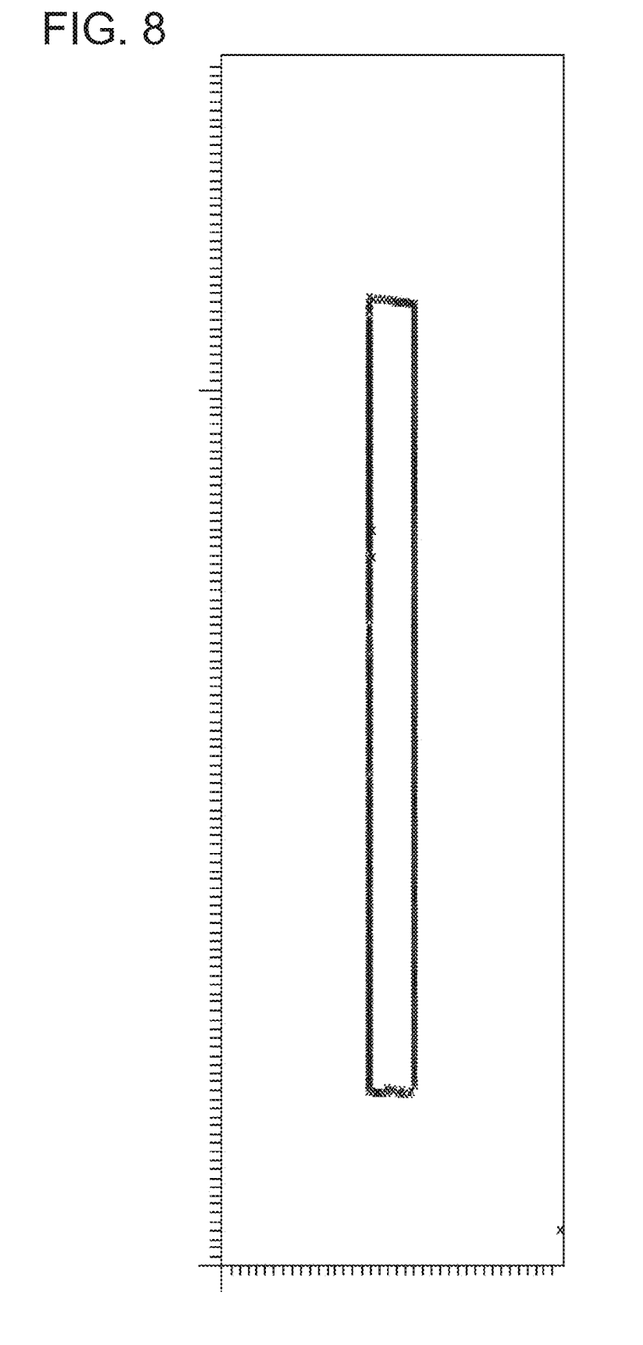
FIG. 8 illustrated the data of FIG. 7 after filtering has been applied to remove unwanted data.

Finally FIG. 8 illustrates the effect of the various ways to filter acquired data, as previously described, to the acquired data of FIG. 7. As shown, all the extraneous information has been removed (or filtered out) and only the surfaces of interested remained.

Figure 9:
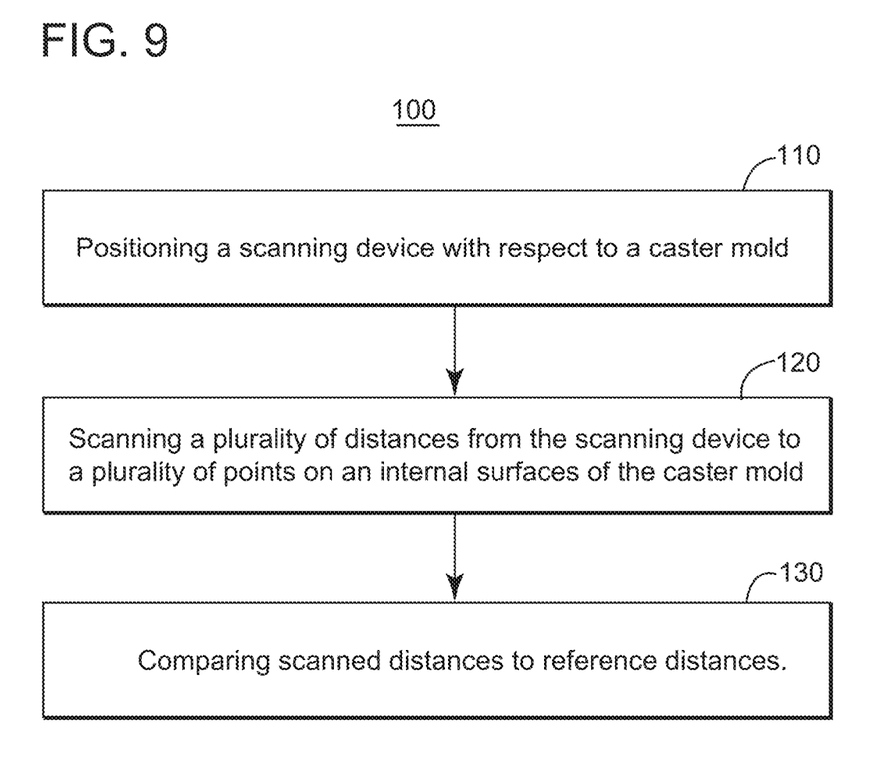
FIG. 9 illustrates a flowchart of a method for monitoring the integrity and measuring the profile of a caster mold according to the subject matter disclosed.

Methods and processes configured to characterize and measure the internal surfaces of caster molds are also within the scope of the subject matter disclosed. FIG. 9 illustrates the flowchart of an exemplary embodiment of a method or process 100 according to the subject matter disclosed. As shown, at 110, a scanning device is positioned with respect to the caster mold by use of a fixture, the scanning device having a laser, optics, a scanner, a photodetector, and receiver electronics. At 120, a plurality a plurality of distances is scanned from a position of the scanning device to a plurality of points on internal surfaces of the caster mold. And finally, at 130, the plurality of distances is compared to reference distances in order to characterize the integrity and measure the profile of the caster mold. The outlined method may further include positioning of the scanning device robotically and/or positioning the scanning device at an offset from a centerline of the caster mold. In such cases, these methods will include characterizing and measuring performed by a combination of distances measured from at least two offset positions before comparing to the reference distances. In some embodiments of the disclosed methods, characterizing the integrity and measuring the profile of the caster mold comprises filtering de measured data, the filtering further comprising a filter selected from a group comprising a statistical filter, a topological filter, and a least-squares filter.

Figure 10:
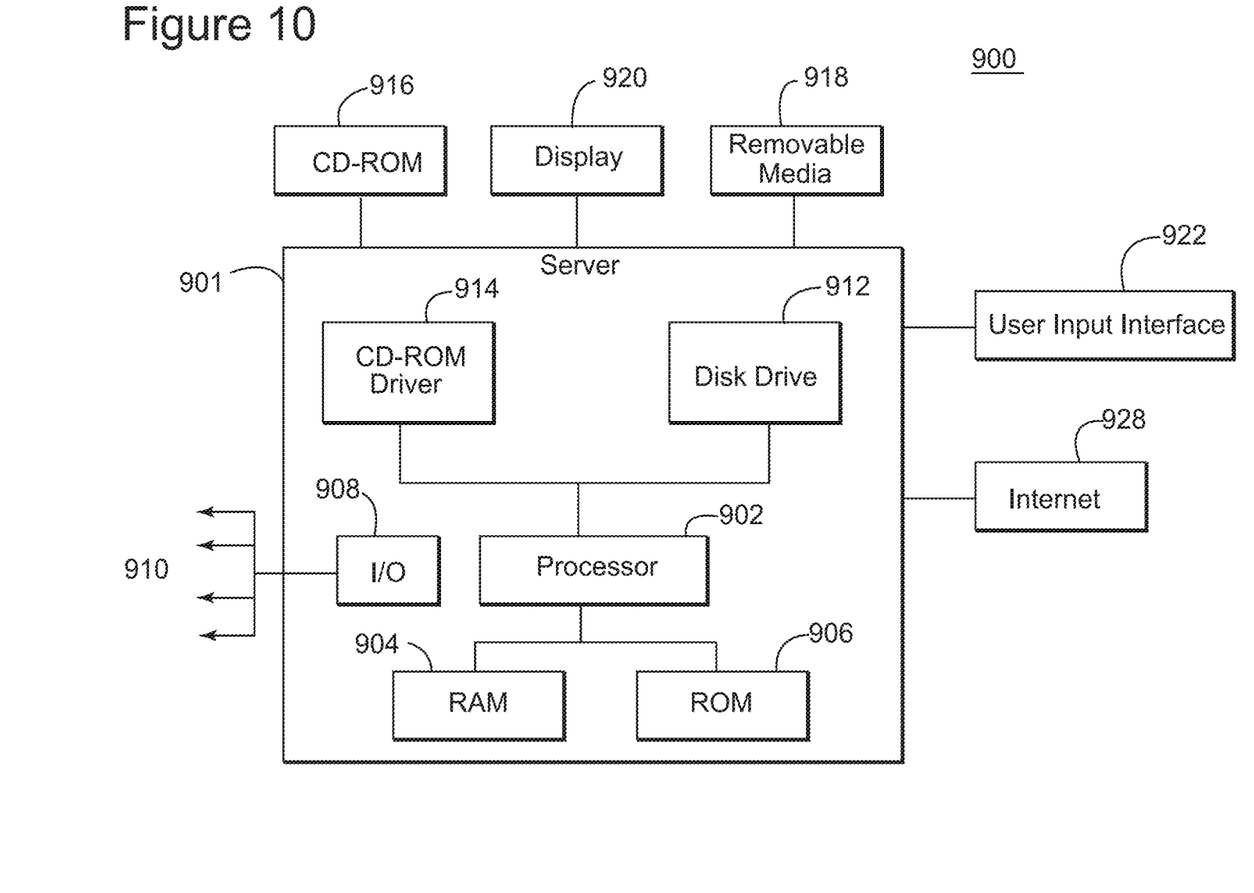
FIG. 10 illustrates a computer system configured to monitor the integrity and measure the profile of a caster mold according to the subject matter disclosed.

One or more of the steps of the methods comprising the subject matter disclosed may be implemented in a computing system specifically configured to characterize and measure the internal surfaces of a caster mold as explained hereinabove. An example of a representative computing system capable of carrying out operations in accordance with the exemplary embodiments is illustrated in FIG. 10. Hardware, firmware, software or a combination thereof may be used to perform the various steps and operations described herein.

The exemplary computing system 900 suitable for performing the activities described in the exemplary embodiments may include server 901. Such a server 901 may include a central processor (CPU) 902 coupled to a random access memory (RAM) 904 and to a read-only memory (ROM) 906. The ROM 906 may also be other types of storage media to store programs, such as programmable ROM (PROM), erasable PROM (EPROM), etc. The processor 902 may communicate with other internal and external components through input/output (I/O) circuitry 908 and bussing 910, to provide control signals and the like. The processor 902 carries out a variety of functions as is known in the art, as dictated by software and/or firmware instructions.

The server 901 may also include one or more data storage devices, including a hard drive 99, CD-ROM drives 914, and other hardware capable of reading and/or storing information such as DVD, etc. In one embodiment, software for carrying out the above-discussed steps may be stored and distributed on a CD-ROM 916, removable memory device 918 or other form of media capable of portably storing information. These storage media may be inserted into, and read by, devices such as the CD-ROM drive 914, the disk drive 912, etc. The server 901 may be coupled to a display 920, which may be any type of known display or presentation screen, such as LCD displays, LED displays, plasma display, cathode ray tubes (CRT), etc. A user input interface 922 is provided, including one or more user interface mechanisms such as a mouse, keyboard, microphone, touch pad, touch screen, voice-recognition system, etc.

The server 901 may be coupled to other computing devices, such as the landline and/or wireless terminals via a network. The server may be part of a larger network configuration as in a global area network (GAN) such as the Internet 928, which allows ultimate connection to the various landline and/or mobile client devices.

The disclosed exemplary embodiments provide apparatuses, methods, and systems for characterizing the integrity and measuring the inside surface of caster molds as well the other uses hereinabove summarized and appreciated by those of ordinary skill in the applicable arts. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments might be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

While the disclosed embodiments of the subject matter described herein have been shown in the drawings and fully described above with particularity and detail in connection with several exemplary embodiments, it will be apparent to those of ordinary skill in the art that many modifications, changes, and omissions are possible without materially departing from the novel teachings, the principles and concepts set forth herein, and advantages of the subject matter recited in the appended claims. Hence, the proper scope of the disclosed innovations should be determined only by the broadest interpretation of the appended claims so as to encompass all such modifications, changes, and omissions. In addition, the order or sequence of any process or method steps may be varied or re-sequenced according to alternative embodiments. Finally, in the claims, any means-plus-function clause is intended to cover the structures described herein as performing the recited function and not only structural equivalents, but also equivalent structures.

What is claimed is:

1. An apparatus for measuring a profile of a caster mold, the apparatus, comprising:
   a scanning device having a laser, optics, a scanner, a photodetector, and receiver electronics, the scanning device being configured to measure distances from a position of the scanning device to a plurality of points on internal surfaces of the caster mold, the caster mold having front and back faces separated from each other by two side faces disposed at end portions of the front and back faces so as to define a cavity of the caster mold, said cavity having a centerline plane defined by a plane generally parallel to the front and back faces bisecting the two side faces of the caster mold;
   a fixture to which the scanning device is attached to, the fixture being configured to position the scanning device with respect to the caster mold; and
   a data reduction device connected to the scanning device, the data reduction device being configured to measure the profile of the caster mold by comparing the measured distances to reference distance values, wherein, said optics are configured to control an ellipticity of a beam profile of the laser incident onto locations of the plurality of points on the internal surfaces of the caster mold, said ellipticity varying depending on the locations of the plurality of points on the internal surfaces of the caster mold.

2. The apparatus according to claim 1, wherein the optics are configured to collimate the laser.

3. The apparatus according to claim 1, wherein the optics are configured to focus the laser.

4. The apparatus according to claim 1, wherein a field of view of the optics is equal to or smaller than about 150 degrees.

5. The apparatus according to claim 1, wherein a stand-off distance of the scanner is substantially zero.

6. The apparatus according to claim 1, wherein the fixture is configured to position the scanning device at an offset from the centerline plane of the caster mold.

7. The apparatus according to claim 6, wherein the distances are measured from at least two offset positions and combined before comparison to the reference distance values, an offset amount depending on dimensions of the caster mold.

8. The apparatus according to claim 1, wherein the caster mold is a thin slab caster mold and end portions of the front and back faces include a central curved elliptical profile defining a funnel shape configured to receive a tundish.

9. The apparatus according to claim 1, further comprising:
   a filter incorporated in the data reduction device, the filter being configured to remove unwanted data from the measured distances.

10. The apparatus according to claim 9, wherein the filter is selected from a statistical filter, a topological filter, and a least-squares filter.

11. The apparatus according to claim 10, wherein, in the statistical filter, measurement points are compared to immediate neighbors and removed if substantially different than the immediate neighbors.

12. The apparatus according to claim 10, wherein, in the topological filter, given an expected topology for the caster mold, measured points further than a threshold distance from a reference measurement of the mold can be removed from the data set.

13. The apparatus according to claim 10, wherein, in the least-squares filter, unwanted measured points are removed by use of a predefined point weighting function.

14. A method for characterizing the integrity and measuring a profile of a caster mold, the method, comprising:
   positioning a scanning device with respect to the caster mold by use of a fixture, the scanning device having a laser, optics, a scanner, a photodetector, and receiver electronics;
   scanning a plurality of distances from a known position of the scanning device to a plurality of points on internal surfaces of the caster mold, the caster mold having two opposing broad faces separated from each other by two opposing narrow faces disposed at end portions of the broad faces so as to define a cavity of the caster mold, said cavity having a centerline plane defined by a plane generally parallel to the broad faces bisecting the two narrow faces of the caster mold; and
   comparing the plurality of distances to reference distances, wherein said optics are configured to control an ellipticity of a beam profile of the laser incident onto locations of the plurality of points on the internal surfaces of the caster mold, said ellipticity varying depending on the locations of the plurality of points on the internal surfaces of the caster mold.

15. The method according to claim 14, wherein the positioning further comprises positioning the scanning device at an offset from the centerline plane of the caster mold.

16. The method according to claim 15, wherein the characterizing and the measuring is performed by a combination of distances measured from at least two offset positions before comparing to the reference distances.

17. The method according to claim 14, wherein characterizing the integrity and measuring the profile of the caster mold comprises filtering de measured data, the filtering further comprising a filter selected from a group comprising a statistical filter, a topological filter, and a least-squares filter.

18. The apparatus according to claim 2, wherein said ellipticity varies from about 7.3:1 to about 114.6:1.

19. The apparatus according to claim 3, wherein said ellipticity varies from about 4.4:1 to about 30.3:1.

20. The method according to claim 14, further comprising:
   focusing the laser with the optics so that said ellipticity varies from about 4.4:1 to about 30.3:1.

21. The method according to claim 14, further comprising:
   collimating the laser with the optics so that said ellipticity varies from about 7.3:1 to about 114.6:1.

* * * * *